United States Patent [19]
Nakamura et al.

[11] Patent Number: 5,720,077
[45] Date of Patent: Feb. 24, 1998

[54] RUNNING ROBOT CARRYING OUT PRESCRIBED WORK USING WORKING MEMBER AND METHOD OF WORKING USING THE SAME

[75] Inventors: Kyoko Nakamura, Toyonaka; Hideaki Nakanishi, Ibaraki; Yuichi Kawakami, Itami; Nobukazu Kawagoe, Toyonaka; Shigeru Oyokota, Takatsuki, all of Japan

[73] Assignee: Minolta Co., Ltd., Osaka, Japan

[21] Appl. No.: 452,280

[22] Filed: May 26, 1995

[30] Foreign Application Priority Data

May 30, 1994 [JP] Japan ................................ 6-116693

[51] Int. Cl.⁶ ........................... A47L 11/12; A47L 5/00
[52] U.S. Cl. ..................... 15/340.1; 15/319; 15/325
[58] Field of Search ................. 134/21, 22.1, 42; 15/319, 325, 339, 340.1, 354; 180/168, 169, 204; 318/568.12, 568.16, 685, 696; 364/424.02, 449; 901/1

[56] References Cited

U.S. PATENT DOCUMENTS

| | | |
|---|---|---|
| 3,739,421 | 6/1973 | Fukuba ................................ 15/319 |
| 4,567,418 | 1/1986 | Takemoto et al. ..................... 318/696 |
| 4,657,104 | 4/1987 | Holland . | 
| 4,674,048 | 6/1987 | Okumura ........................... 364/424.02 |
| 4,736,826 | 4/1988 | White et al. ............................ 901/1 |
| 4,773,815 | 9/1988 | Lemelson . |
| 5,046,914 | 9/1991 | Holland et al. .......................... 901/1 |
| 5,208,521 | 5/1993 | Aoyama ................................. 15/319 |
| 5,284,522 | 2/1994 | Kobayashi et al. ....................... 15/319 |
| 5,309,592 | 5/1994 | Hiratsuka ............................... 15/319 |

FOREIGN PATENT DOCUMENTS

| | | |
|---|---|---|
| 62-8234 | 2/1987 | Japan . |
| 4-328607 | 11/1992 | Japan . |
| 4-338433 | 11/1992 | Japan . |
| 40 5-207955 | 8/1993 | Japan ................................. 15/339 |

*Primary Examiner*—Terrence Till
*Attorney, Agent, or Firm*—Burns, Doane, Swecker & Mathis, LLP

[57] ABSTRACT

A running member is attached rotatably to a body member, and a working member is attached movably to the body member. Therefore, in a large area, a work can be carried out efficiently even in a corner portion, and a desired work can be implemented even in a narrowed portion by shifting the working member to a working area and directly operating the working member in the narrowed portion.

19 Claims, 17 Drawing Sheets

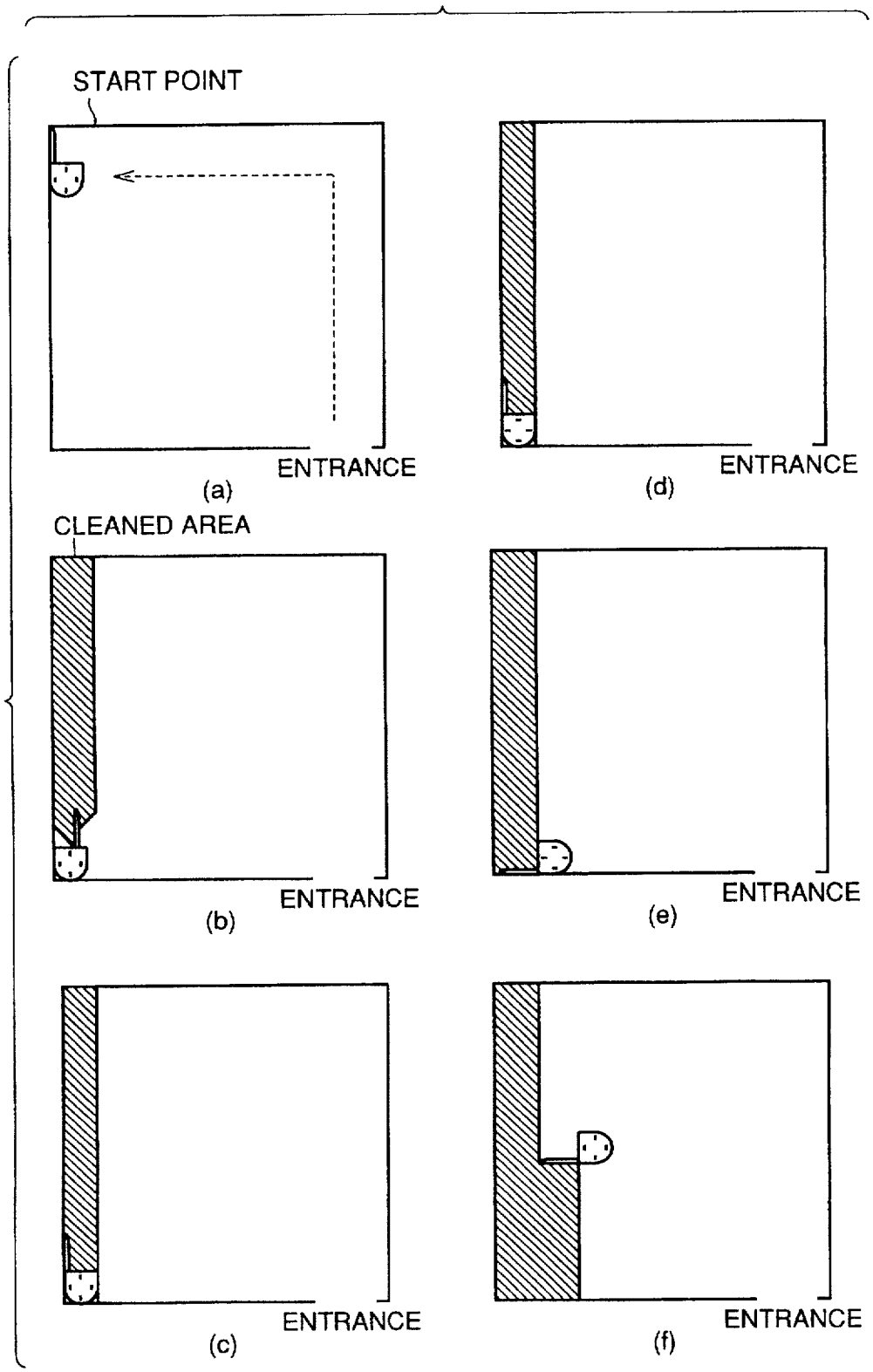

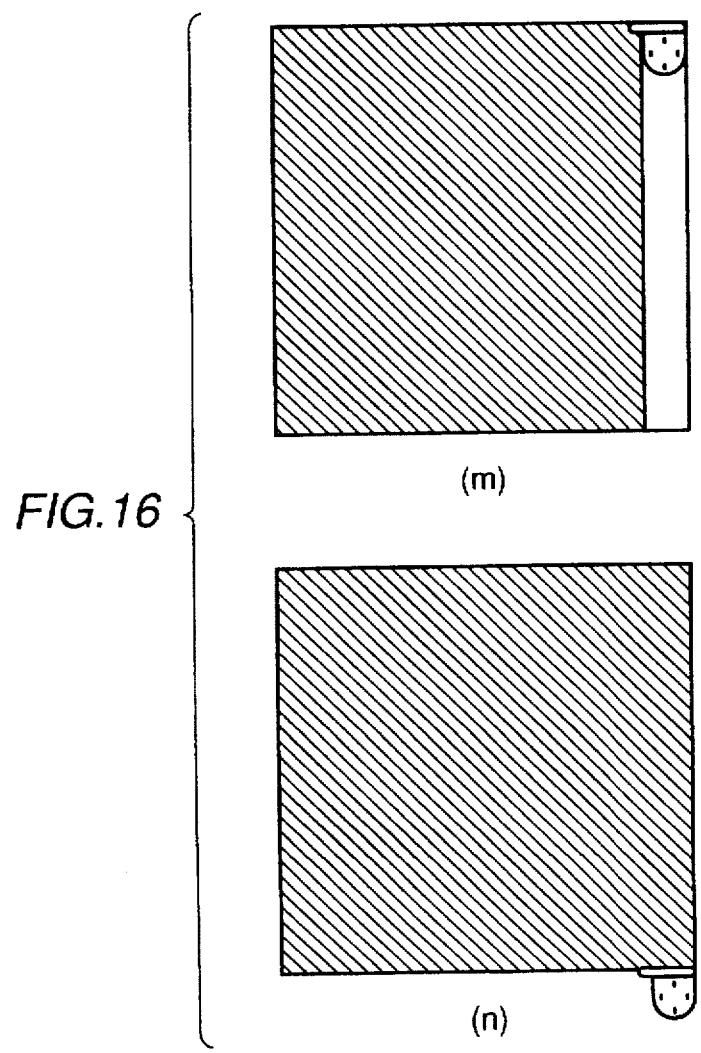
FIG.16 (m) (n)

RUNNING ROBOT CARRYING OUT PRESCRIBED WORK USING WORKING MEMBER AND METHOD OF WORKING USING THE SAME

BACKGROUND OF THE INVENTION

1. Field of the Invention

The present invention relates to an autonomously running robot having a working member, autonomously running indoors or outdoors, and carrying out mowing, cleaning, waxing, chemical spraying, or the like.

2. Description of the Related Art

In the field of a conventional autonomously running robot, an autonomously running vacuum-cleaner having a working member and a running member and automatically carrying out a cleaning work is suggested in Japanese Patent Laying-Open No. 4-338433, a cleaning robot which can clean a room including the vicinity of an obstacle is suggested in Japanese Patent Laying-Open No. 4-328607, and a method of controlling an automatic vacuum-cleaner which can clean a room including the verge of a wall by moving a vacuum opening brush of the vacuum-cleaner is suggested in Japanese Patent Publication No. 62-8234.

As is disclosed in the embodiment of Japanese Patent Laying-Open No. 4-338433, however, the above described conventional autonomously running vacuum-cleaner has its working member provided under the body. Therefore, the working robot cannot work in a small portion such as a corner of a room, a corner between a wall and a floor, a space between objects, and a space under an object.

The cleaning robot disclosed in Japanese Patent Laying-Open No. 4-328607 uses a brush for cleaning a corner of a room. Since the cleaning robot cannot move its working member directly to a working area, however, dust is inconveniently raised in using the brush.

In the method disclosed in Japanese Patent Publication No. 62-8234, it is possible to clean the verge of a wall. However, when it is desired to clean a corner of a working area, such as a corner of a room, the automatic vacuum-cleaner must change its direction many times, thereby hampering an efficient work.

SUMMARY OF THE INVENTION

One object of the present invention is to provide an autonomously running robot capable of carrying out a work efficiently in a large area including a corner, and capable of implementing a desired work also in a narrowed portion by moving a working member to a working area and directly operating the working member.

In one aspect of the present invention, the running robot includes a transporter rotatably attached to a housing, and a working member movably attached to the housing. Therefore, the running robot can carry out a work in a large working area at one time by operating the working member in a fixed state or in a running state, depending on the situation, and carry out a work efficiently to a corner of the working area. In addition, even in a narrowed portion of the working area, the running robot can carry out a desired work by inserting the working member into the portion and moving the working member therein.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9 and 10 are diagrams for explaining an example of a working procedure in a room of the autonomously running vacuum-cleaner according to the first embodiment of the present invention.

FIGS. 14 to 16 are diagrams for explaining an example of a working procedure in a room of the autonomously running vacuum-cleaner according to the second embodiment of the present invention.

DESCRIPTION OF THE PREFERRED EMBODIMENTS

Figure 1:
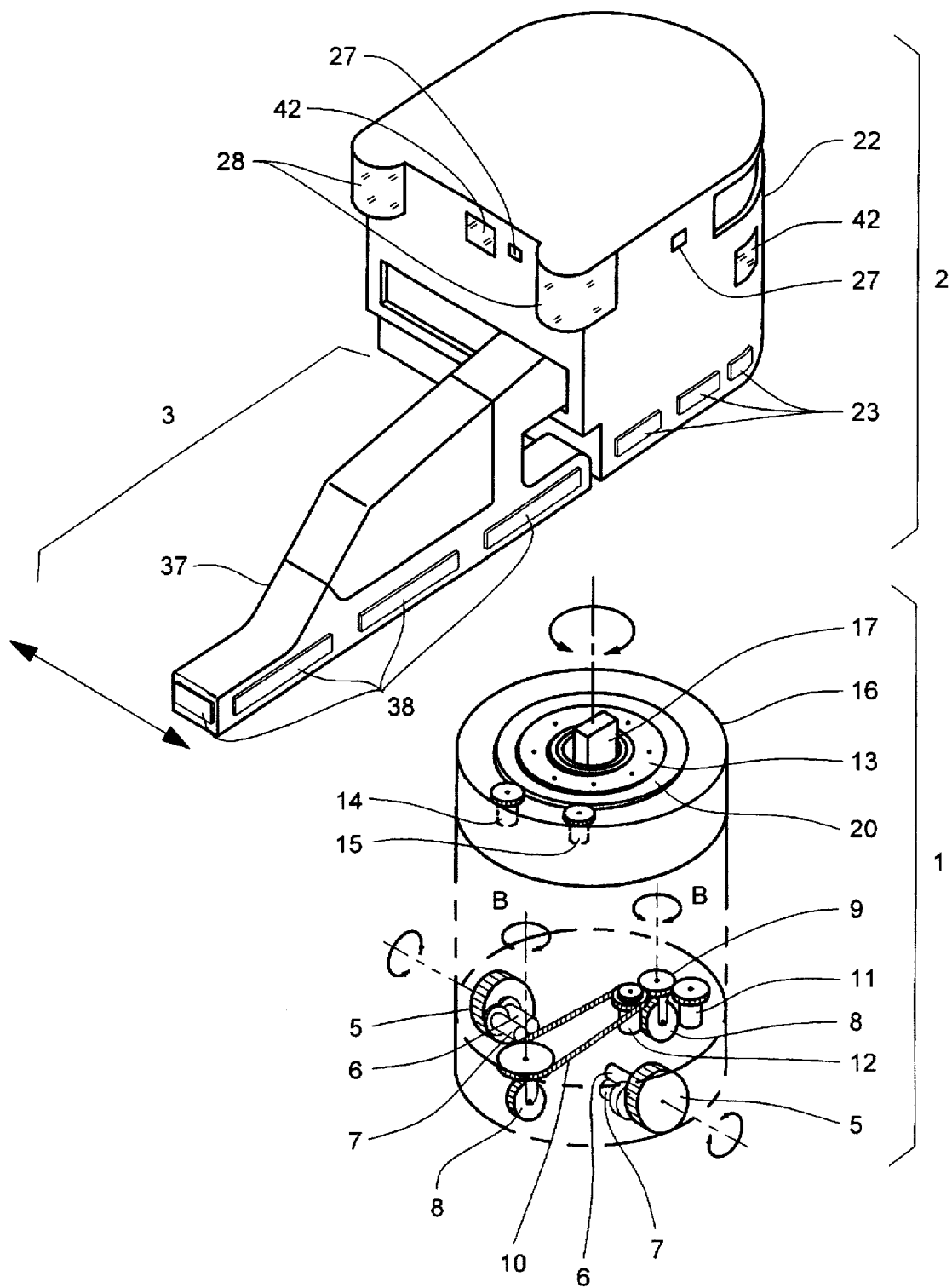
FIG. 1 is a perspective view of an autonomously running vacuum-cleaner according to a first embodiment of the present invention.

The embodiments of the present invention will be described hereinafter with reference to the drawings. Note that the same or corresponding portions are labeled with the same reference characters in each embodiment.

In the first embodiment, an autonomously running robot is structured into an autonomously running vacuum-cleaner. FIG. 1 is a perspective view of an autonomously running vacuum-cleaner of the first embodiment, with its main components exploded. The autonomously running vacuum-cleaner includes a running member 1, a body member 2, and a working member 3.

Running member 1 will first be described. Drive wheel driving motors 6 drive two drive wheels 5, respectively, and are fixed to a frame 16. Distance detectors 7 for reading out the number of rotations of motors 6, that is, the number of rotations of drive wheels 5, through a gear and measuring the distance covered by the autonomously running vacuum-cleaner are connected to drive wheel driving motors 6, respectively. Further, a suspension mechanism, not shown, is provided to at least one of drive wheels 5. Even when the autonomously running vacuum-cleaner runs on a floor having a recess and a projection, the suspension mechanism makes drive wheels 5 always in contact with the floor to prevent idle running of drive wheels 5 and to stabilize running of the vacuum-cleaner. The suspension mechanism also decreases an error of the distance detector.

Two steering wheels 8 are supported by frame 16. Two steering wheels 8 are coupled to one steering wheel driving motor 12 by a gear group 9 and a belt 10. Gear group 9 and belt 10 cause the two steering wheels to rotate oppositely in the direction indicated by double-headed arrow B's. A potentiometer 11 is attached to steering wheel driving motor 12 through gear group 9, so that potentiometer 11 can measure a rotation angle of steering wheels 8 in the direction of the double-headed arrow B. Steering wheels 8 and drive wheels 5 support the weight of the autonomously running vacuum-cleaner.

As shown in FIG. 2, two drive wheels 5 are arranged on the line X-X' in symmetry, and steering wheels 8 are arranged on the line Y-Y' perpendicular to the line X-X'.

Description will be given of an example of a method of advancing or rotating the autonomously running vacuum-cleaner using running member 1.

Figure 2A:
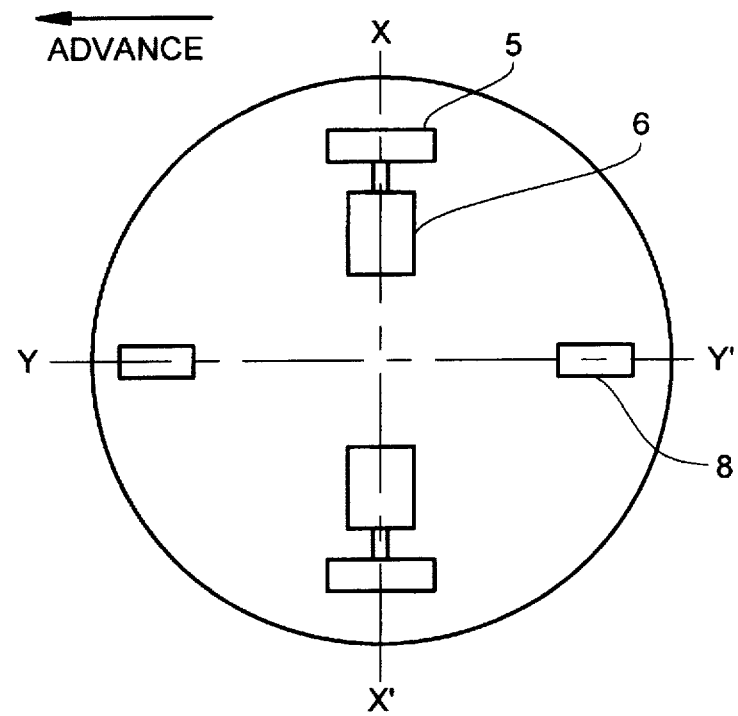
FIGS. 2a,b are diagrams for explaining operation of straight movement and rotation of the autonomously running vacuum-cleaner according to the first embodiment of the present invention.
Figure 2B:
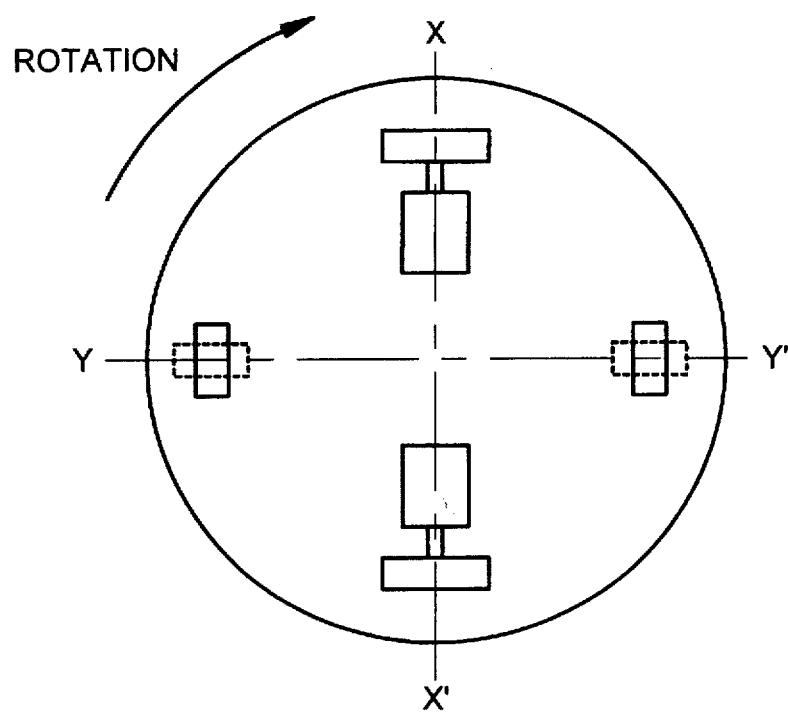

As shown in FIG. 2(a), when running member 1 runs straight, the running member holds steering wheels 8 in parallel with the line Y-Y', and rotates two drive wheel driving motors 6 in the same direction. When the running member rotates around the center of the body, the running member can rotate by holding steering wheels 8 orthogonal to the line Y-Y' using steering wheel driving motor 12, as shown in FIG. 2(b), and rotating two drive wheel driving motors 6 in the opposite directions.

Figure 3:
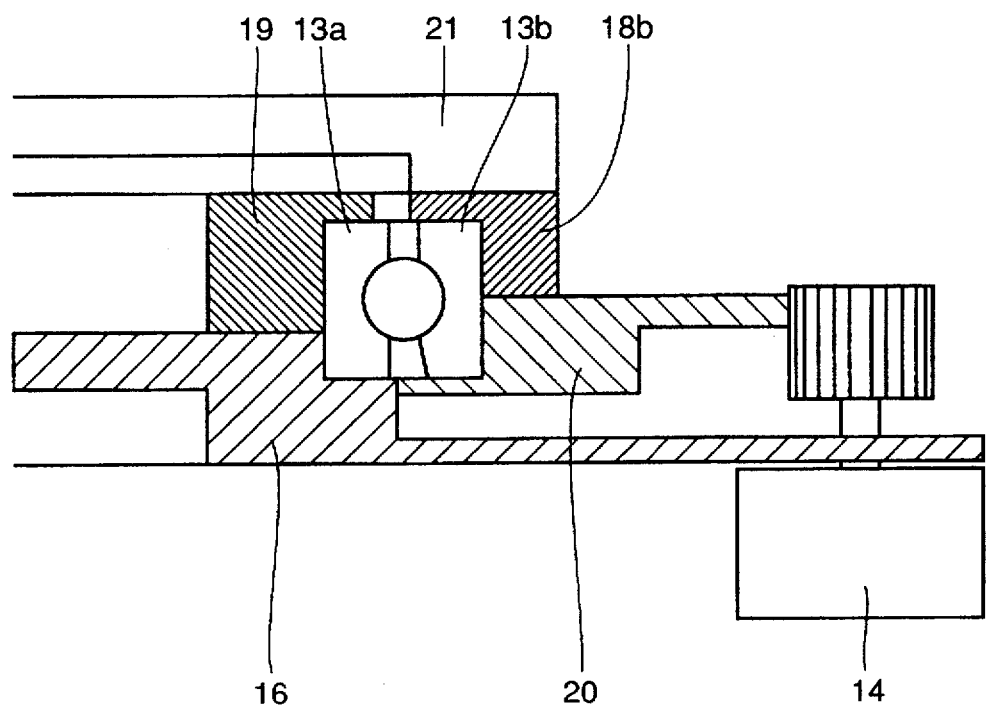
FIG. 3 is a diagram for explaining a body member rotation mechanism of the autonomously running vacuum-cleaner according to the first embodiment of the present invention.
Figure 4:
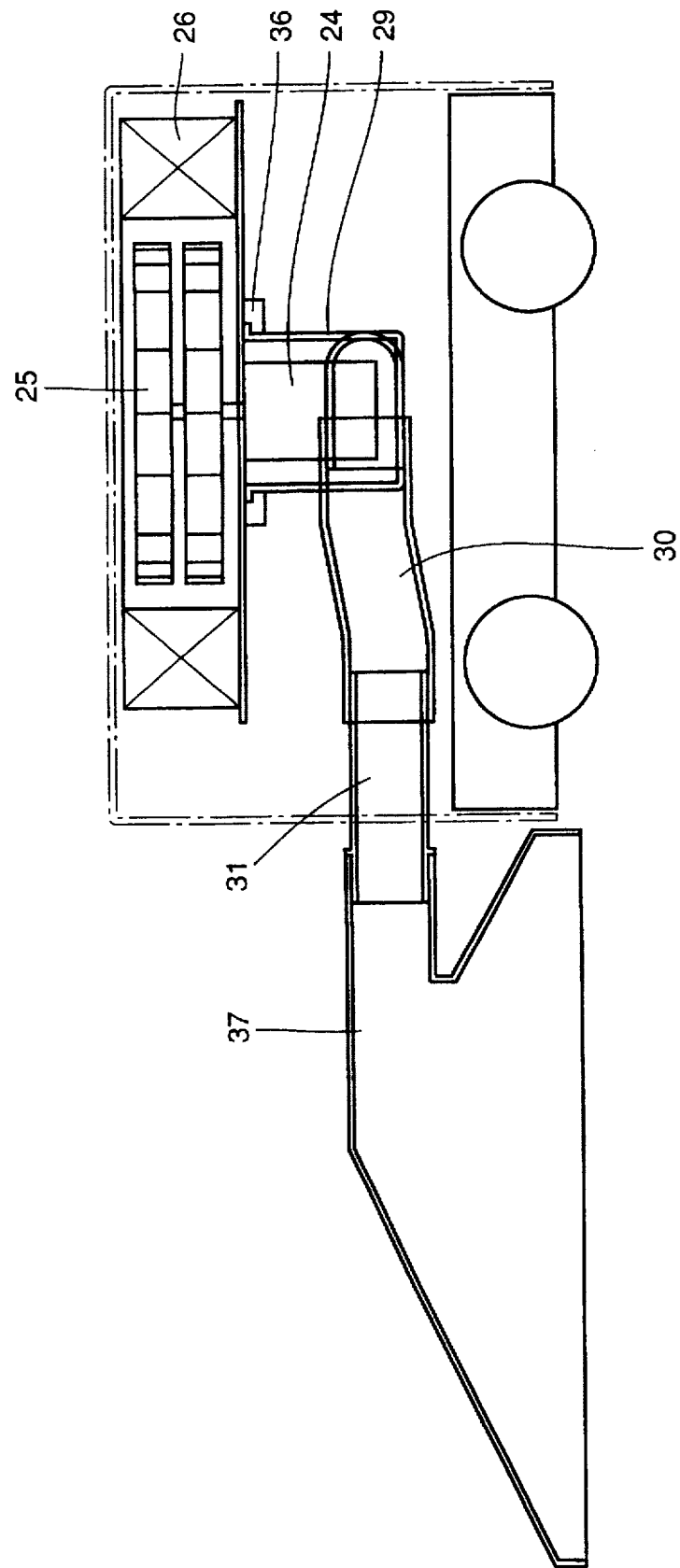
FIG. 4 is a sectional view of the autonomously running vacuum-cleaner according to the first embodiment of the present invention.

Running member 1 is further provided with a bearing mechanism 13 rotating body member 2 with respect to running member 1. As shown in FIG. 3, running member frame 16 is fixed to a bearing inner wheel 13a of bearing mechanism 13 by a bearing inner wheel holder 19, and a body member rotating and driving gear 20 is fixed to a bearing outer wheel 13b of bearing mechanism 13 by a bearing outer wheel holder 18. Further, a body member frame 21 is fixed to bearing outer wheel holder 18.

By structured as described above, body member 2 can be rotated with respect to running member 1 independently. Further, a body member rotating motor 14 is attached to running member frame 16 to drive body member rotating and driving gear 20 through the gear. Further, a potentiometer 15 (cf. FIG. 1) is attached to body member rotating and driving gear 20 through the gear, so that a rotation angle of body member 2 with respect to running member 1 can be precisely detected.

In this embodiment, a stepping motor is used as body member rotating motor 14 to rotate running member 1 and body member 2. However, the same function can be implemented by replacing the stepping motor with a servo motor. In the body member rotation mechanism, body member 2 can be rotated by approximately −90° ~approximately +90° with respect to the Y-Y' axis of running member 1. Further, a gyro sensor 17 is mounted in the vicinity of the center of rotation of running member 1. Gyro sensor 17 is used for detection of a rotation angle of running member 1 and control of straight movement of running member 1.

Description will now be given of body member 2. Body member 2 can be rotated with respect to running member 1. An outer case 22 of body member 2 is attached so as to cover running member 1. A plurality of contact sensors 23 are provided side by side on a lower peripheral surface of outer case 22, so that contact of body member 2 with a wall or obstacle can be sensed.

Body member 2 further includes a distance sensor 27 for measuring the distance up to the wall or obstacle, a position detecting unit 28 for receiving light emitted from a cleaning start point and recognizing the position and the azimuth of body member 2, an infrared communication device 42 for carrying out communication to and from the outside world, and the like.

Driving motors 6, body member rotating and driving motor 14, gyro sensor 17, and the like of running member 1 are under power supply control and drive control by a power supply portion and a control portion, not shown, of body member 2. Therefore, power supply lines and control lines for driving motors 6, body member rotating and driving motor 14, and gyro sensor 17 pass through the center portion of ring-shaped bearing mechanism 13 connecting running member 1 and body member 2, thereby preventing a large torsion or the like of the lines caused by rotation of running member 1 and body member 2.

Description will now be given of working member 3 with reference to FIGS. 1, 4, 5 and 6. 24 is a vacuum motor, to which a vacuum relay portion 29, a vacuum hose 30, a nozzle relay portion 31, and a vacuum nozzle 37 vacuuming dust on the floor are sequentially coupled. Like outer case 22, vacuum nozzle 37 is provided with a plurality of contact sensors 38 at its lower peripheral side surface (cf. FIG. 1), so that contact of vacuum nozzle 37 with a wall or obstacle can be sensed.

Vacuum nozzle 37 is elongate, so that it can be inserted into a small space. Vacuum nozzle 37 has a vacuum opening therearound. The exhaust air of a vacuum fan portion 25 is discharged through a ventilating filter 26 after particulates are removed. Vacuum nozzle relay portion 31 provided at an end of vacuum nozzle 37 is attached to a guide plate 32 shown in FIG. 6. Guide plate 32 can move right and left on an ACCURIDE RAIL slidable rail, available from Standard Precision Inc., 34 attached to body member frame 21. Note that any slidable rail can be used in the present invention.

Guide plate 32 is engaged with a slide belt 35 driven right and left by a slide motor 33 attached to body member frame 21. Guide plate 32 moves on ACCURIDE RAIL 34 together with sliding of slide belt 35. Therefore, working member 3 is slidably driven right and left by slide motor 33 (cf. FIG. 6).

Figure 5:
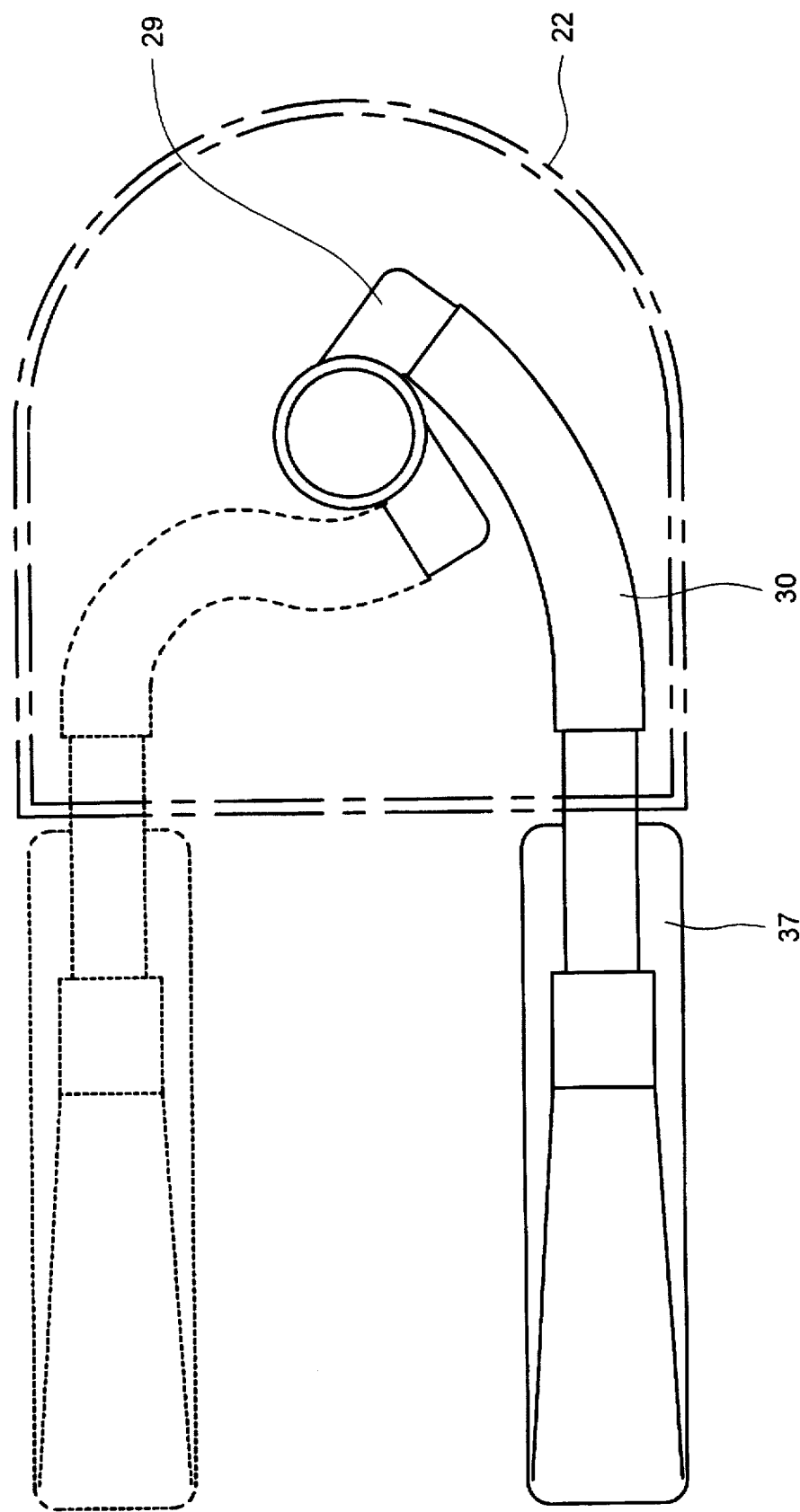
FIG. 5 is a diagram for explaining operation of a working member of the autonomously running vacuum-cleaner according to the first embodiment of the present invention.
Figure 6:
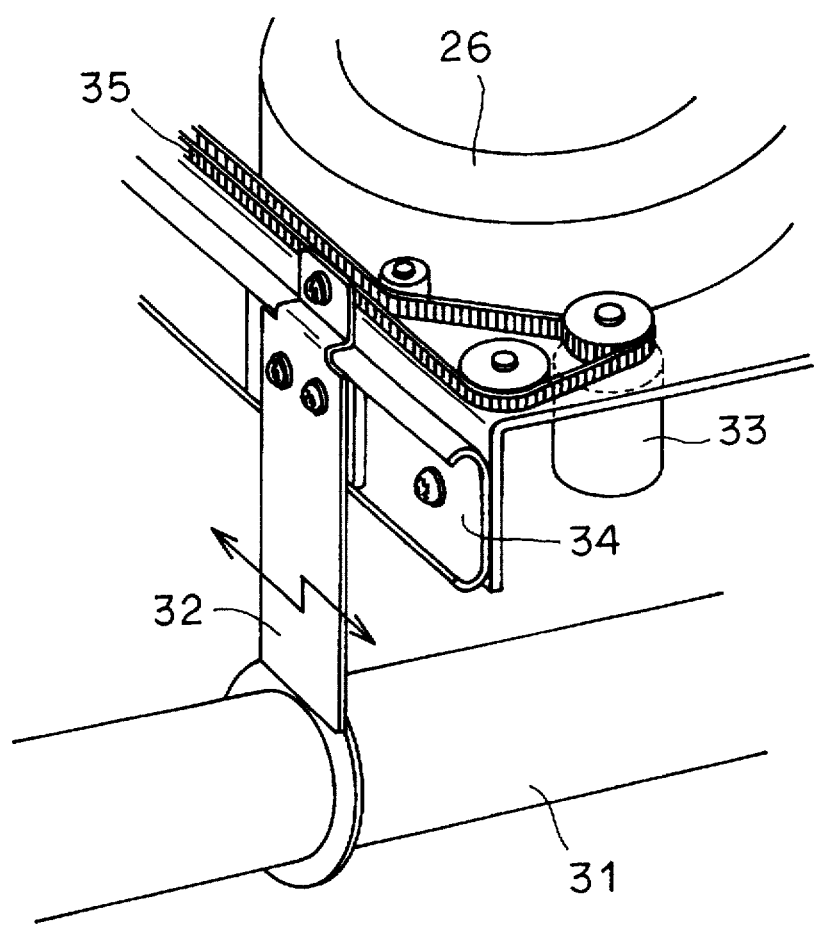
FIG. 6 is a perspective view of a vacuum nozzle slide mechanism of the autonomously running vacuum-cleaner according to the first embodiment of the present invention.

In order to ensure moving of vacuum nozzle 37 without restriction, vacuum relay portion 29 is attached to the side of the inner wheel of a ring-shaped bearing 36, and body member frame 21 is attached to the side of the outer wheel. By thus structured, vacuum relay portion 29 can be rotated with respect to body member frame 21, as shown in FIG. 5. When vacuum nozzle 37 is placed on the right side of Accuride Rail 34, as shown in FIG. 5, vacuum relay portion 29 is pushed into vacuum hose 30, and rotated left.

On the other hand, when vacuum nozzle 37 moves in parallel on Accuride Rail 34 towards left in the figure with movement of guide plate 32, vacuum hose 30 moves left by being dragged by vacuum nozzle relay portion 31. Further, vacuum relay portion 29 also rotates right, so that vacuum nozzle 37, vacuum hose 30, and vacuum relay portion 29 can move smoothly.

Figure 7A:
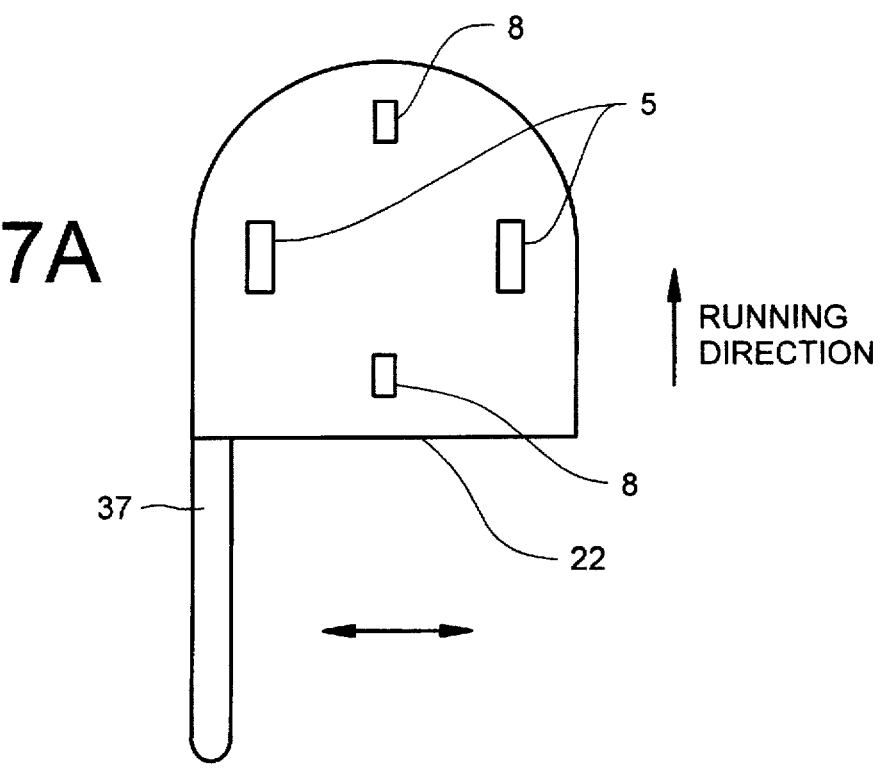
FIGS. 7a, b are diagrams for explaining an example of working operation of the autonomously running vacuum-cleaner according to the first embodiment of the present invention.

An example of a method of a running work by this mechanism will now be shown. When a work is carried out in a large area, vacuum nozzle 37 is positioned backward with respect to the running direction, as shown in FIG. 7(a). The running member moves forward with steering wheels 8 facing the running direction, and right and left drive wheels 5 rotating in the same direction. By sliding vacuum nozzle 37 right and left with respect to the running direction, a work using an elongate nozzle in a large area is facilitated.

Figure 7B:
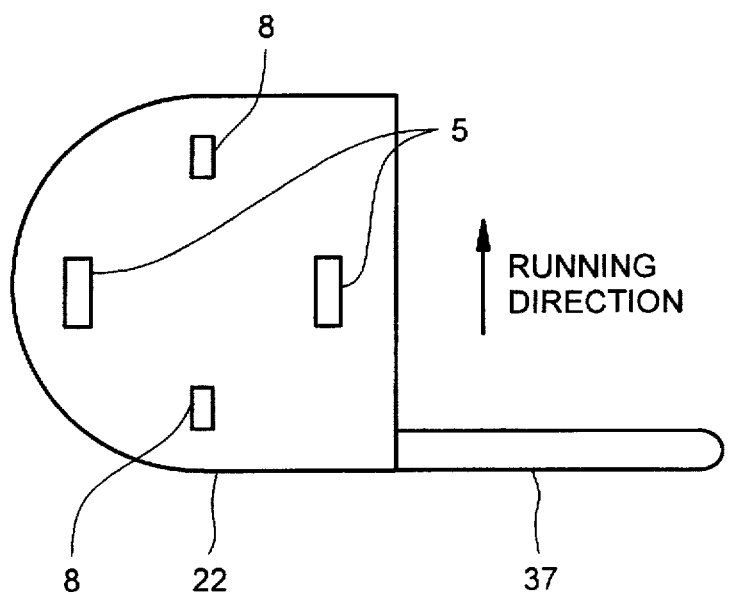

The similar effect is obtained by positioning vacuum nozzle 37 perpendicular to the running direction by the above described body member rotation mechanism, as shown in FIG. 7(b), and moving the running member forward with vacuum nozzle 37 fixed. In this case, vacuum nozzle 37 may be fixed at any position within the sliding range.

Figure 8A:
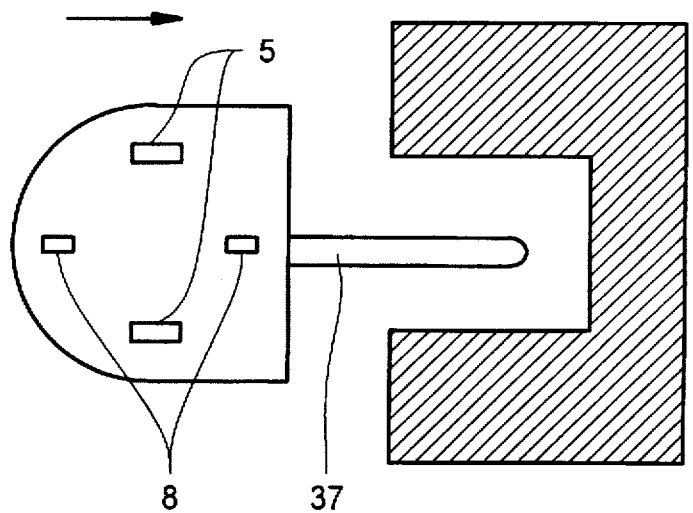
FIGS. 8a, b are diagrams for explaining an example of work in a narrowed area of the autonomously running vacuum-cleaner according to the first embodiment of the present invention.
Figure 8B:
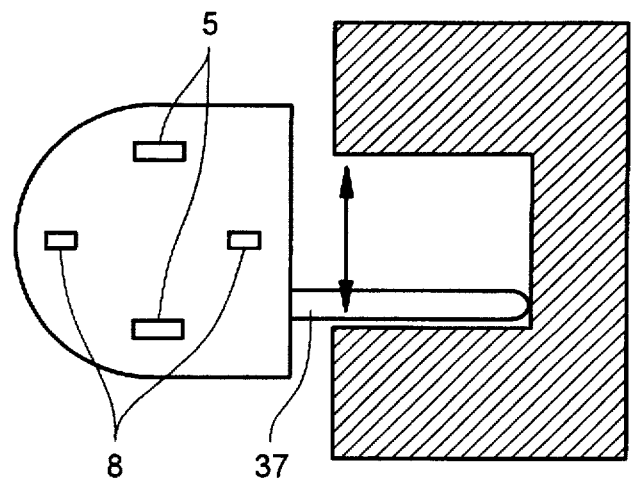

When a work is carried out to a narrow portion such as a space, the running member moves forward with the nozzle inserted into the space, as shown in FIG. 8(a). The running member stops at a position appropriate for the work, slides the nozzle in that state, as shown in FIG. 8(b), and carries out the work to the space.

Figure 10:
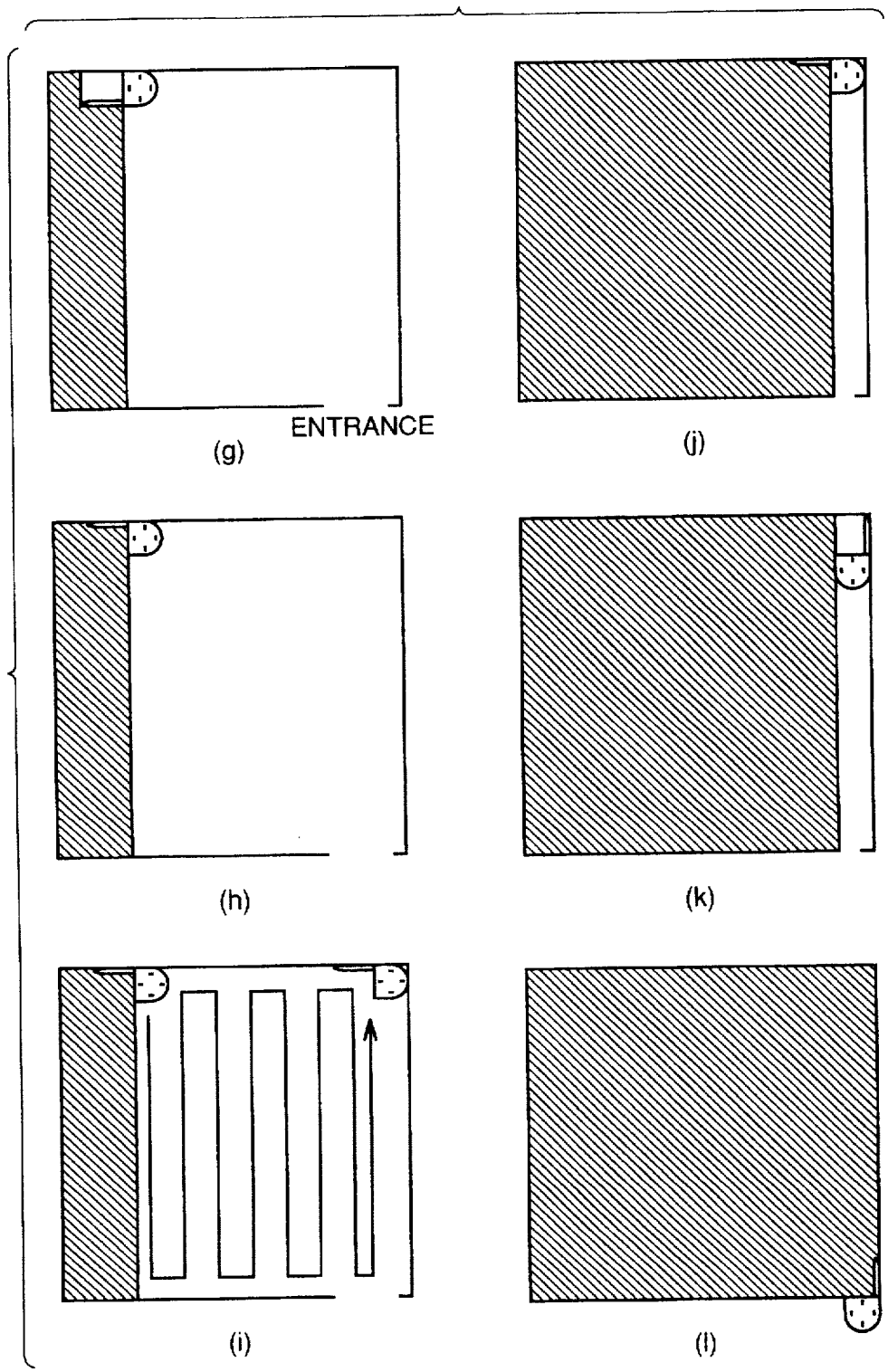

By combining the above described functions, such a room as shown in FIGS. 9 and 10 (which show a series of operation) is completely cleaned by reciprocate operation of the running member. An example of the cleaning procedure will be described. In cleaning a room having only one entrance, in general, it is considered to be effective to start cleaning from a point furthermost from the entrance and to end cleaning at the entrance. This is because the dust in the room can be completely swept away from the inner part of the room toward the entrance.

First, the autonomously running vacuum-cleaner which enters the room through the entrance is positioned at the start point of FIG. 9(a). Then, the vacuum-cleaner cleans the room along the side wall from the start point. By carrying out vacuum-cleaning with the longer side of the vacuum nozzle in parallel with the wall, the dust on the verge of the wall can be vacuumed up efficiently. While moving forward along the side wall, the autonomously running vacuum-cleaner slides vacuum nozzle 37 described with reference to FIG. 7(a), and cleans the verge of the wall (FIG. 9(b)).

The vacuum-cleaner runs until it comes in contact with the front wall (FIG. 9(c)). With the method described with reference to FIG. 2(b), only the running member is rotated left by 90°. Then, steering wheels 8 are rotated back, and the vacuum-cleaner moves along the front wall up to a position at which body member 2 and vacuum nozzle 37 can turn. After the vacuum-cleaner moves by a necessary distance, the vacuum-cleaner rotates body member 2 and working member 3.

Then, the vacuum-cleaner moves backward until vacuum nozzle 37 comes in contact with the side wall, and the vacuum-cleaner corrects its position (FIG. 9(d)). By sliding vacuum nozzle 37 back .and forth one time in this state, complete cleaning along the side wall can be carried out. After sliding back and forth, vacuum nozzle 37 is positioned along the side wall. As a result, the autonomously running vacuum-cleaner is along the front wall (FIG. 9(e)).

By adjusting the amount of overlapping of cleaning areas, the vacuum-cleaner moves forward to the next cleaning area. By again rotating the running member, the autonomously running vacuum-cleaner changes its running direction. Vacuum nozzle 37 continues suction with the longer side perpendicular to the running direction (FIG. 9(f)), and moves until it comes in contact with the front wall. When the vacuum-cleaner arrives at the rear wall (FIG. 10(g)), the vacuum-cleaner slides vacuum nozzle 37 to the verge of the wall, and cleans the remaining area (FIG. 10(h)). By rotation, the vacuum-cleaner changes the running direction so as to be along the front wall, adjusts the amount of overlapping of the cleaning areas, and moves to the next cleaning area.

Similarly, the vacuum-cleaner continues reciprocation (FIG. 10(i)) until it comes in contact with the wall on the side of end of the work as shown in FIG. 10(j). In order to carry out cleaning along the other side wall, the vacuum-cleaner changes its direction. The vacuum-cleaner moves forward along the other side wall up to a position at which body member 2 and vacuum nozzle 37 can turn. After rotating body member 2 and vacuum nozzle 37, the vacuum-cleaner moves backward until vacuum nozzle 37 comes in contact with the wall (FIG. 10(k)).

The vacuum-cleaner slides vacuum nozzle 37 from the wall towards the opposite side, and cleans the backward of the body. After that, the vacuum-cleaner moves forward with vacuum nozzle 37 slided, and carries out cleaning along the side wall. Since the vacuum-cleaner has the same size in length and width, the vacuum-cleaner can carry out cleaning completely (FIG. 10(l)). According to the above procedure, cleaning of a room can be implemented with a vacuum-cleaner structured according to this embodiment.

Figure 11:
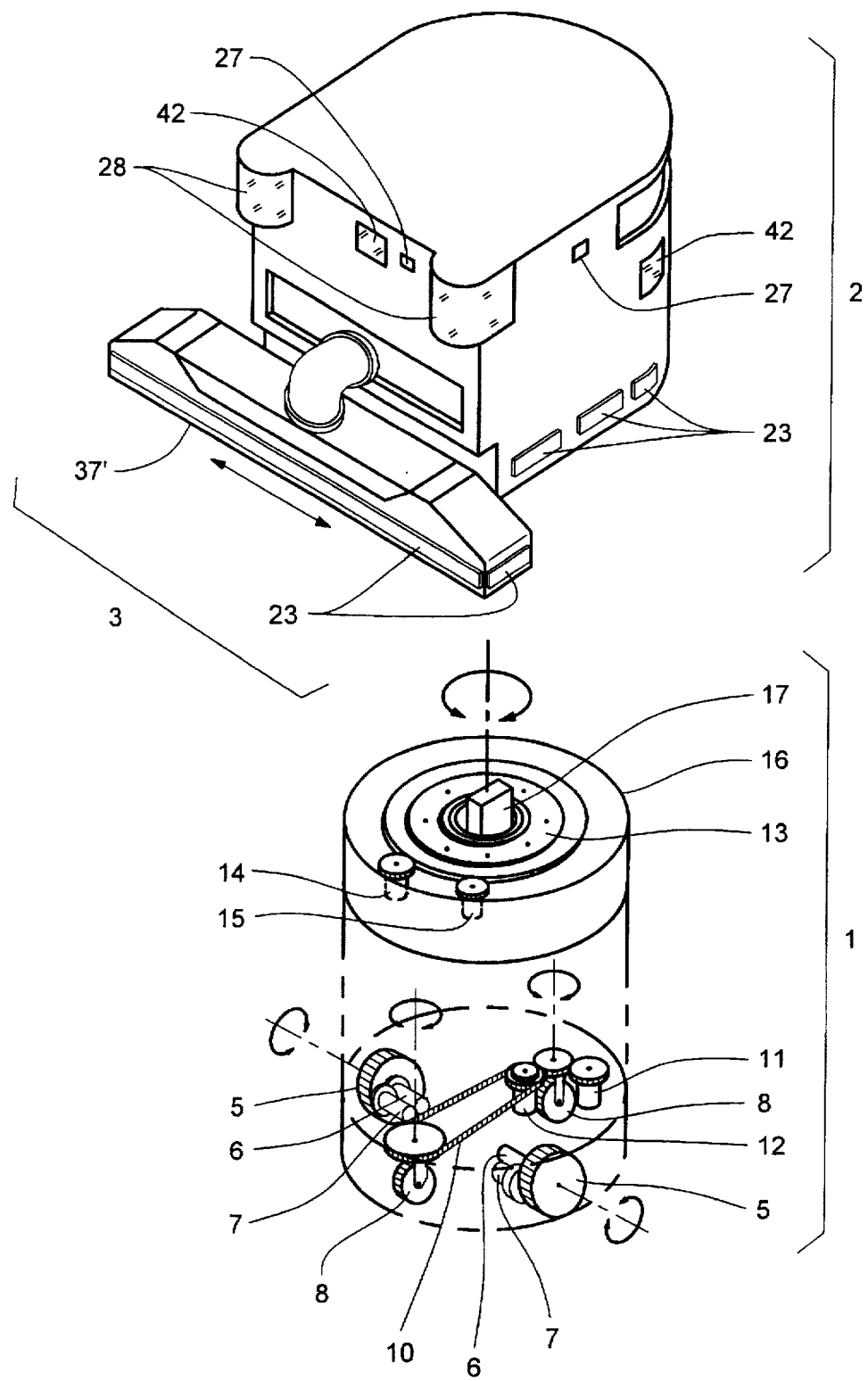
FIG. 11 is a perspective view of an autonomously running vacuum-cleaner according to a second embodiment of the present invention.

The second embodiment of the present invention will be described. Similar to the case of the first embodiment, an autonomously running robot is applied to an autonomously running vacuum-cleaner in the second embodiment. FIG. 11 is a perspective view of the autonomously running vacuum-cleaner of the second embodiment. The second embodiment is different from the first embodiment in a shape of vacuum nozzle 37' of working member 3. As to running member 1 and body member 2, the second embodiment is the same as the first embodiment.

In the second embodiment, vacuum nozzle 37' is attached in parallel with a rear surface of the body member, as shown in FIG. 11, so that vacuum nozzle 37' can be slided right and left with respect to body member 2. Two degrees of freedom of working member 3 are implemented by rotation of body member 2 with respect to running member 1 and sliding of vacuum nozzle 37'.

Figure 12A:
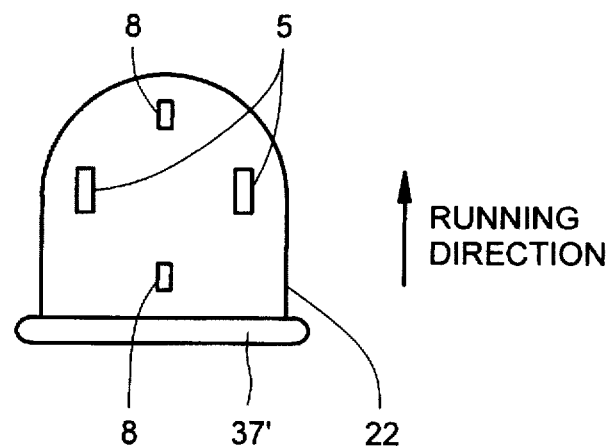
FIGS. 12a, b are diagrams for explaining an example of working operation of the autonomously running vacuum-cleaner according to the second embodiment of the present invention.

One example of a method of a running work according to this mechanism will be shown. When carrying out a work in a large area, vacuum nozzle 37' is positioned backward with respect to the running direction by the above described body member rotation mechanism, as shown in FIG. 12(a). In addition, vacuum nozzle 37' is positioned so that it will vacuum-clean the running tracks of drive wheels 5 and steering wheels 8.

Figure 12B:
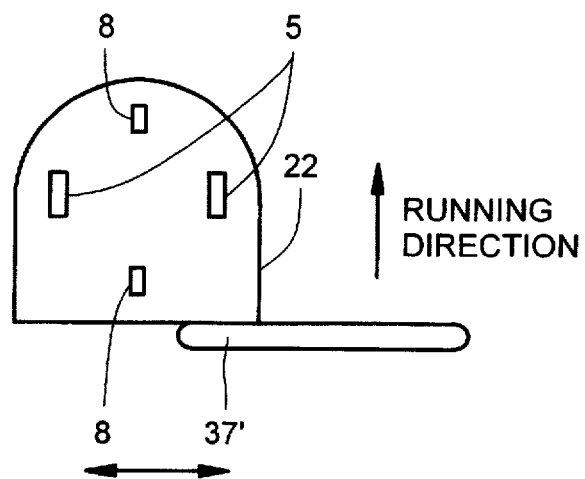

The vacuum-cleaner turns steering wheels 8 in the running direction, and moves forward by rotating right and left drive wheels 5 in the same direction. When carrying out a work to a narrow portion such as a space, the vacuum-cleaner runs with vacuum nozzle 37' projected from body member 2, as shown in FIG. 12(b). In this case, vacuum nozzle 37' may be fixed at any position within the sliding range.

Figure 13A:
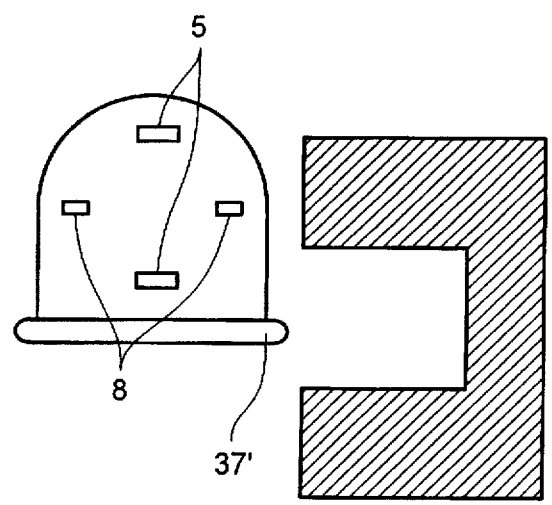
FIGS. 13a–c are diagrams for explaining an example of work in a narrowed area of the autonomously running vacuum-cleaner according to the second embodiment of the present invention.
Figure 13B:
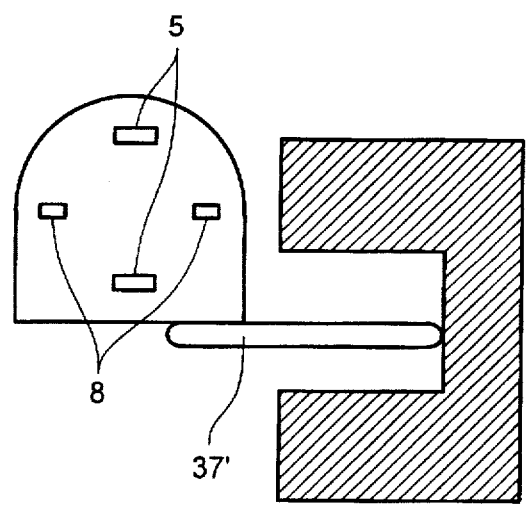
Figure 13C:
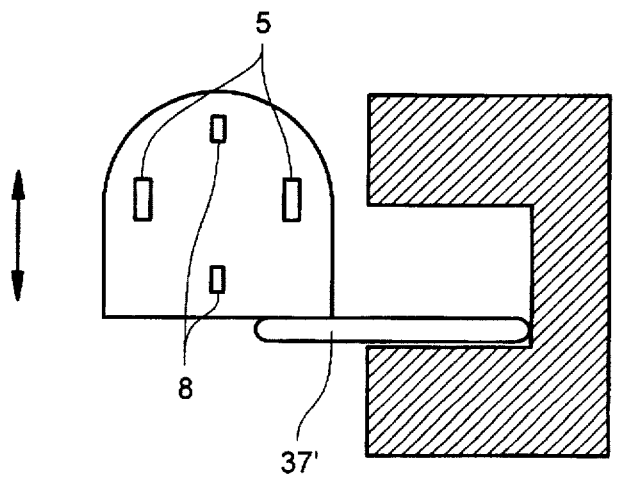

A method of carrying out a work to the narrow portion such as a space will be described in detail with reference to FIG. 13. The vacuum-cleaner approaches a wall having a space. When the vacuum-cleaner moves to an appropriate position (FIG. 13(a)), the vacuum-cleaner projects vacuum nozzle 37', and inserts vacuum nozzle 37' into the space (FIG. 13(b)). Then, the vacuum-cleaner fixes the amount of projection of vacuum nozzle 37', and moves the body member back and forth in the direction in parallel with the wall, whereby the vacuum-cleaner can clean the space. While running in parallel with the wall, the vacuum-cleaner controls vacuum nozzle 37' to be continuously in contact with the wall, whereby the vacuum-cleaner can clean the narrow portion such as a space with vacuum nozzle 37' inserted therein.

Figure 14:
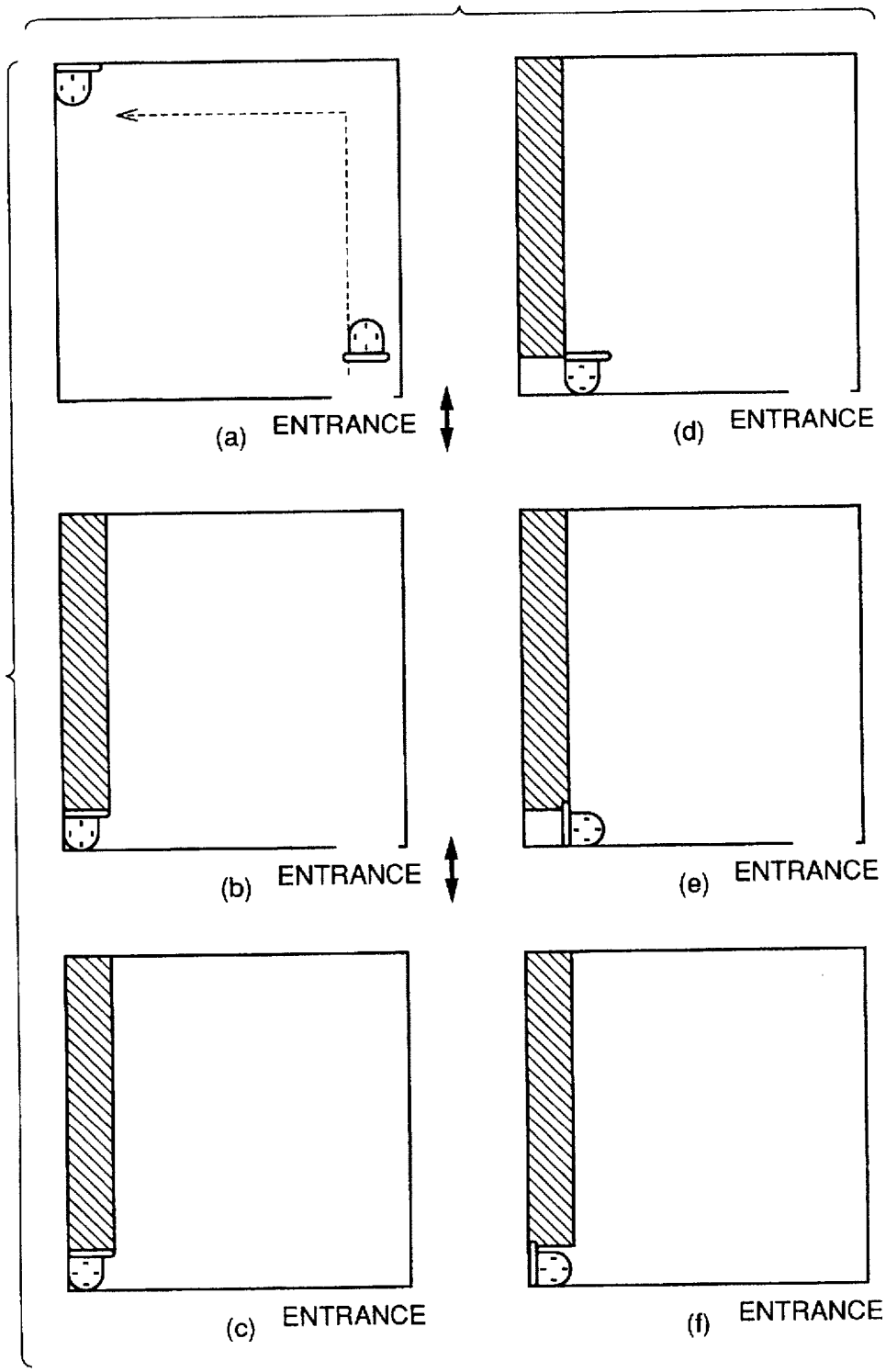
Figure 15:
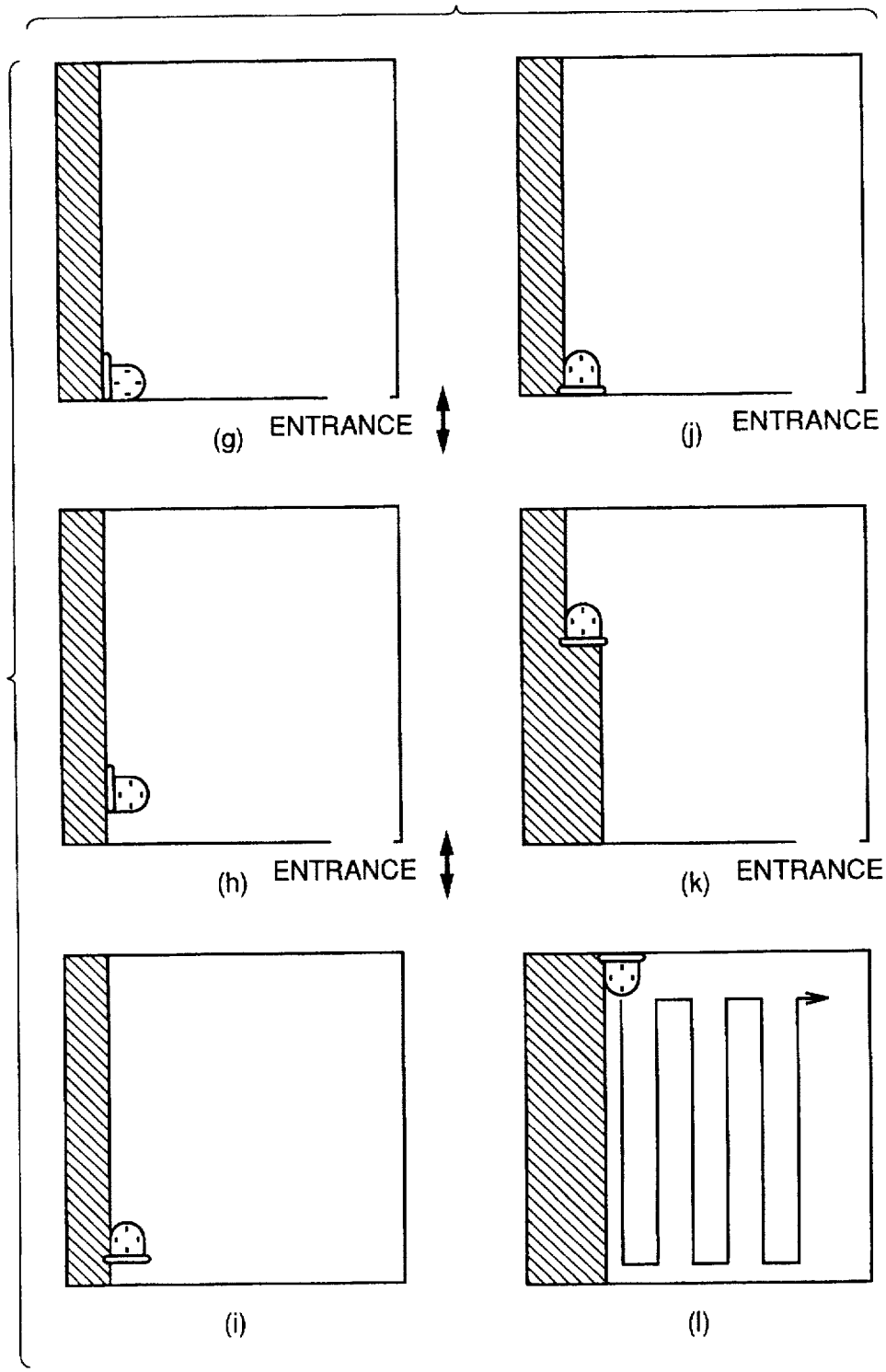

An example of cleaning a room completely by reciprocation by combining the above described functions will be shown with reference to FIGS. 14 to 16 (which show a series of operation). Similar to the case of the first embodiment, cleaning is carried out from the start point in the room which is furthermost from the entrance towards the entrance also in this embodiment.

The autonomously running vacuum-cleaner which enters the room through the entrance is positioned at the start point of FIG. 14(a). Then, the vacuum-cleaner carries out cleaning along the side wall from the start point. At this time, the vacuum-cleaner slides vacuum nozzle 37' so that the side surface of the body member matches the side end of vacuum nozzle 37', and carries out cleaning the vicinity of the wall.

The vacuum-cleaner moves forward until it comes in contact with the front wall and stops (FIG. 14(b)). Then, the vacuum-cleaner rotates steering wheels 8, and rotates running member 1 left by 90° at the present stop position (FIG. 14(c)). After that, the vacuum-cleaner rotates steering wheels 8 back, and moves straight along the front wall up to a position at which the vacuum-cleaner can turn body member 2 and vacuum nozzle 37'. After advancing by a necessary distance (FIG. 14(d)), the vacuum-cleaner rotates body member 2 and vacuum nozzle 37' positioned over running member 1 (FIG. 14(e)).

Then, the vacuum-cleaner moves backward until vacuum nozzle 37' comes in contact with the side wall, and corrects the position (FIG. 14(f)). The vacuum-cleaner moves forward by an appropriate distance so that an area which has already been swept and an area to be swept next overlap each other appropriately (FIG. 15(e)). In order to turn, the vacuum-cleaner rotates only running member 1 left by 90° at the present stop position with the above described method of FIG. 2(b). The vacuum-cleaner moves forward by a sufficient distance for body member 2 and vacuum nozzle 37' positioned over running member 1 to rotate (FIG. 15(h)), and rotates body member 2 and vacuum nozzle 37' attached thereto left by 90°.

After rotation, the vacuum-cleaner returns vacuum nozzle 37' which is aligned with the right side surface of the body member to its original position (FIG. 15(i)), moves the body backward to the wall, and corrects the position (FIG. 15(j)). After that, the vacuum-cleaner moves forward until it comes in contact with the rear wall (FIG. 15(k)), and shifts vacuum nozzle 37' so that the left end of vacuum nozzle 37' matches the left surface of the body member. Then, the vacuum-cleaner rotates both running member 1 and body member 2 right by 90°. After rotation, the vacuum-cleaner moves forward by an appropriate distance so that an area which has already been swept and an area to be swept next overlap each other appropriately. Then, the vacuum-cleaner rotates only running member 1 right by 90° at the present position. Then, the vacuum-cleaner moves forward by a sufficient distance for body member 2 and vacuum nozzle 37' positioned over running member 1 to rotate, and rotates body member 2 and vacuum nozzle 37' attached thereto right by 90°.

After rotation, the vacuum-cleaner returns vacuum nozzle 37' which is aligned with the left side surface of body member 2 to its original position. Then, the vacuum-cleaner moves backward to the wall, and corrects the position. After that, the vacuum-cleaner moves forward until it comes in contact with the front wall. Similarly, the vacuum-cleaner continues running back and forth until the other side wall (FIG. 15(l)).

In the state of FIG. 16(m), the vacuum-cleaner shifts vacuum nozzle 37' so that the left end of vacuum nozzle 37' and the left surface of the body member match in order to carry out cleaning along the other side wall. The vacuum-cleaner carries out cleaning along the other side wall, and completes the work (FIG. 16(n)). According to the above described procedure, the vacuum-cleaner of this embodiment can implement cleaning in the room.

Figure 17A:
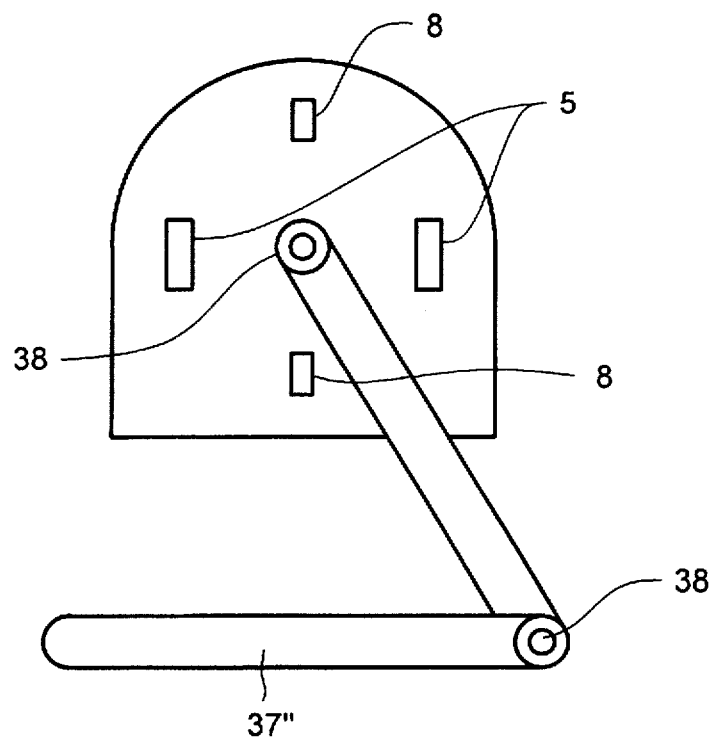
FIGS. 17a, b are diagrams for explaining a structure according to other embodiments of the present invention.
Figure 17B:
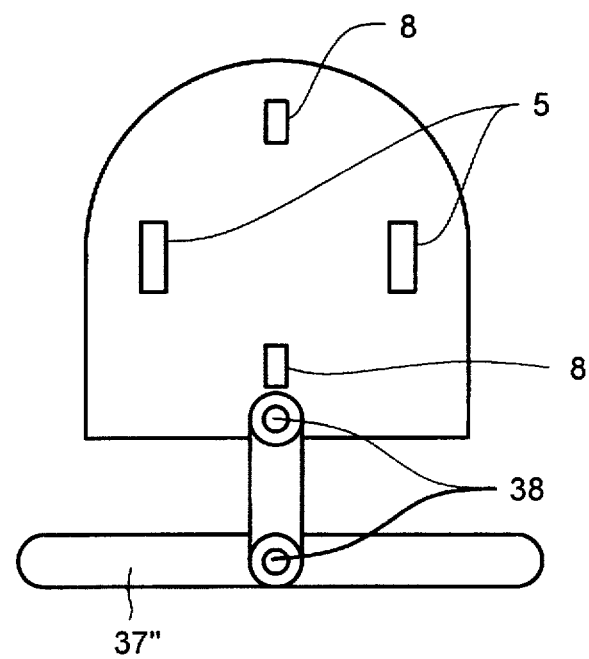

In addition to the above described first and second embodiments, such structures as shown at (a) and (b) of FIG. 17 are also considered as embodiments of the present invention. FIG. 17(a) shows a structure in which an arm having one drivable joint is rotatably fixed to a carriage, and FIG. 17(b) shows an implementation of two degrees of freedom structured with two rotation axes 38 at vacuum nozzle 37'. Also in these embodiments, it is possible to carry out a work with working member 3 projecting into a necessary portion, and it is possible to directly carry out a work to a working portion with working member 3 inserted into a space, similar to the above two embodiments.

Note that these embodiments are illustrated by way of an example of the present invention. The present invention is not limited to these embodiments.

As described above, according to the present invention, it is possible to carry out a work in a large working area at one time by operating the working member in a fixed state or in a running state, depending on the situation. It is also possible to carry out a work to a corner of the working area efficiently. Further, the working member can directly act on the working area of a narrowed portion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A running robot, comprising:
   a running member having a driving mechanism and a wheel;
   a body member being rotatably coupled with said running member; and
   a working member projecting from said body member along a projected direction, said working member being shiftable with respect to said body member in a shifting direction that is perpendicular to the projected direction and is parallel to a floor on which the running robot is used.

2. The running robot as claimed in claim 1, wherein said working member is elongate in a direction perpendicular to the shifting direction.

3. The running robot as claimed in claim 1, wherein said working member is elongate in a direction parallel to the shifting direction.

4. The running robot as claimed in claim 1, wherein said running member is equipped with a pair of drive wheels which are arranged on a first line and which are rotated independently on a central axis.

5. The running robot as claimed in claim 4, wherein said running member is further equipped with a steering wheel for changing a moving direction of said running robot.

6. The running robot as claimed in claim 4, wherein said running member is further equipped with a pair of steering wheels which are arranged on a second line perpendicular to the first line, and are turned oppositely each other in a plane parallel to a floor.

7. The running robot as claimed in claim 6, further comprising means for holding the pair of steering wheels in a direction orthogonal to the second line and for rotating the pair of drive wheels in an opposite direction for turning the running robot around its central axis.

8. The running robot as claimed in claim 6, further comprising means for holding the pair of steering wheels in a direction parallel to the second line and for rotating the pair of drive wheels in a same direction when the running member advances the running robot straight.

9. The running robot as claimed in claim 4, further comprising a suspension mechanism which supports at least one drive wheel.

10. The running robot as claimed in claim 1, wherein said working member cleans a floor on which said running robot stands.

11. The running robot as claimed in claim 1, wherein the body member is rotated with respect to the running member by means of a bearing mechanism and a motor.

12. The running robot as claimed in claim 11, further comprising a potentiometer which detects a rotation angle of the body member with respect to the running member.

13. The running robot as claimed in claim 11, wherein the motor is a stepping motor.

14. The running robot as claimed in claim 1, wherein the working member has at least one contact sensor on its outer surface, said contact sensor sensing contact of the working member with an obstacle.

15. The running robot as claimed in claim 1, wherein the working member has at least one distance sensor on its outer surface, said distance sensor measuring a distance to an obstacle.

16. The running robot as claimed in claim 1, wherein the working member is a cleaner.

17. The running robot as claimed in claim 1, wherein the body member has almost the same size in length and width as the running member.

18. The running robot as claimed in claim 17, wherein the working member is a cleaner.

19. A running robot, comprising:

a running member having a driving mechanism and means for moving the running member along a floor;

a body member being rotatably coupled with said running member; and a working member projecting from said body member along a projected direction, said working member being shiftable with respect to the body member in a shifting direction that is perpendicular to the projected direction and is parallel to the floor.

* * * * *